US 9,803,609 B2

(12) United States Patent
Setterberg et al.

(10) Patent No.: US 9,803,609 B2
(45) Date of Patent: Oct. 31, 2017

(54) SYSTEM AND METHODS FOR IMPROVED STARTING OF COMBUSTION ENGINES

(71) Applicant: Maxwell Technologies, Inc., San Diego, CA (US)

(72) Inventors: Ulf Carl Mikael Setterberg, La Jolla, CA (US); Jeremy Michael Cowperthwaite, San Diego, CA (US); Jeff Brakley, Carlsbad, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 263 days.

(21) Appl. No.: 14/692,116

(22) Filed: Apr. 21, 2015

(65) Prior Publication Data

US 2015/0300307 A1    Oct. 22, 2015

Related U.S. Application Data

(60) Provisional application No. 61/982,559, filed on Apr. 22, 2014.

(51) Int. Cl.
| | |
|---|---|
| *H02J 7/14* | (2006.01) |
| *H02J 7/00* | (2006.01) |
| *H02J 1/10* | (2006.01) |
| *H02J 1/12* | (2006.01) |
| *F02N 11/08* | (2006.01) |

(Continued)

(52) U.S. Cl.
CPC ........ *F02N 11/087* (2013.01); *F02N 11/0866* (2013.01); *H02J 1/10* (2013.01); *H02J 7/1423* (2013.01); *H02J 7/34* (2013.01); *F02N 11/04* (2013.01); *F02N 2011/0885* (2013.01); *F02N 2011/0888* (2013.01); *F02N 2200/063* (2013.01)

(58) Field of Classification Search
CPC .................................................... F02N 11/087
USPC ................................................ 320/104, 166
See application file for complete search history.

(56) References Cited

U.S. PATENT DOCUMENTS

| 2,730,630 A | 1/1956 | Bruno |
| 3,816,805 A | 6/1974 | Terry |

(Continued)

FOREIGN PATENT DOCUMENTS

| CN | 1701482 | 11/2005 |
| CN | 101888001 | 11/2010 |

(Continued)

OTHER PUBLICATIONS

Dougherty, Thomas, Power Point Presentation, "The Use of Ultra Capacitors in Stop/Start and Traditional Vehicle Starting," presented Mar. 14, 2011, 13 pages.

(Continued)

*Primary Examiner* — Edward Tso
*Assistant Examiner* — Ahmed Omar
(74) *Attorney, Agent, or Firm* — Knobbe Martens Olson & Bear LLP

(57) ABSTRACT

This disclosure provides systems, methods and apparatus for a engine start system. In one aspect, the engine start system includes: a booster battery selectively connected in parallel with the primary batteries of the engine. The booster battery is disconnected when the battery voltage of the primary batteries is below a first target voltage. The booster battery is connected when the battery voltage of the primary batteries is at or above the second target voltage, or in response to an external input.

29 Claims, 5 Drawing Sheets

(51) Int. Cl.
*H02J 7/34* (2006.01)
*F02N 11/04* (2006.01)

(56) References Cited

U.S. PATENT DOCUMENTS

| | | | |
|---|---|---|---|
| 4,672,294 A | 6/1987 | Norton | |
| 4,697,134 A | 9/1987 | Burkum et al. | |
| 5,126,675 A | 6/1992 | Yang | |
| 5,726,553 A | 3/1998 | Waugh | |
| 5,783,322 A | 7/1998 | Nagai et al. | |
| 5,808,443 A | 9/1998 | Lundstrom | |
| 5,849,426 A | 12/1998 | Thomas et al. | |
| 5,994,789 A | 11/1999 | Ochiai | |
| 6,057,666 A * | 5/2000 | Dougherty | H02J 7/0054 320/104 |
| 6,075,331 A | 6/2000 | Ando et al. | |
| 6,222,341 B1 | 4/2001 | Dougherty et al. | |
| 6,229,279 B1 | 5/2001 | Dierker | |
| 6,271,642 B1 | 8/2001 | Dougherty et al. | |
| 6,373,152 B1 | 4/2002 | Wang et al. | |
| 6,392,348 B1 | 5/2002 | Dougherty | |
| 6,445,162 B1 | 9/2002 | Mukainakano | |
| 6,452,361 B2 | 9/2002 | Dougherty et al. | |
| 6,628,107 B1 | 9/2003 | Bang et al. | |
| 6,765,312 B1 | 7/2004 | Urlass | |
| 7,119,518 B1 | 10/2006 | Dougherty et al. | |
| 7,193,390 B2 | 3/2007 | Nagai et al. | |
| 7,362,005 B2 | 4/2008 | Leblanc | |
| 7,667,432 B2 | 2/2010 | West et al. | |
| 7,887,943 B2 | 2/2011 | Yoshikane et al. | |
| 9,272,627 B2 | 3/2016 | Miller | |
| 9,300,018 B2 | 3/2016 | Watson et al. | |
| 2002/0008495 A1 | 1/2002 | Dougherty et al. | |
| 2003/0026092 A1 | 2/2003 | Reese et al. | |
| 2003/0236656 A1 | 12/2003 | Dougherty | |
| 2004/0018397 A1 | 1/2004 | Nagai et al. | |
| 2005/0003710 A1 | 1/2005 | Congdon et al. | |
| 2005/0110468 A1 | 5/2005 | Turner et al. | |
| 2006/0098390 A1 | 5/2006 | Ashtiani et al. | |
| 2006/0119314 A1 | 6/2006 | Stephenson, III | |
| 2006/0201724 A1 | 9/2006 | Leblanc | |
| 2008/0246443 A1 | 10/2008 | Doljack | |
| 2008/0268330 A1 | 10/2008 | Hansen et al. | |
| 2008/0315829 A1 | 12/2008 | Jones et al. | |
| 2009/0212626 A1 | 8/2009 | Snyder et al. | |
| 2009/0284076 A1 | 11/2009 | Lin et al. | |
| 2011/0189533 A1 | 8/2011 | Reis et al. | |
| 2011/0234171 A1 | 9/2011 | An et al. | |
| 2011/0293993 A1 | 12/2011 | Ryu | |
| 2012/0235473 A1 | 9/2012 | Jiang et al. | |
| 2012/0235511 A1 | 9/2012 | Watson et al. | |
| 2012/0235624 A1 | 9/2012 | Sisk et al. | |
| 2012/0235642 A1 | 9/2012 | Mao et al. | |
| 2012/0237799 A1 | 9/2012 | Jiang et al. | |
| 2012/0319471 A1 | 12/2012 | Miller | |
| 2013/0162029 A1 | 6/2013 | Reichow et al. | |
| 2013/0266824 A1 | 10/2013 | Cowperthwaite et al. | |
| 2013/0266825 A1 | 10/2013 | Cowperthwaite et al. | |
| 2013/0266826 A1 | 10/2013 | Cowperthwaite et al. | |
| 2014/0136055 A1 * | 5/2014 | Sugiyama | B62D 5/0481 701/42 |
| 2016/0176298 A1 | 6/2016 | Watson et al. | |

FOREIGN PATENT DOCUMENTS

| | | |
|---|---|---|
| CN | 102164780 | 8/2011 |
| DE | 10 2007 004279 A1 | 7/2008 |
| EP | 0 844 486 A2 | 5/1998 |
| EP | 0 844 486 A3 | 7/1998 |
| EP | 1 025 632 B1 | 4/2003 |
| EP | 1 720 231 B1 | 11/2009 |
| EP | 2 314 861 A1 | 4/2011 |
| EP | 1864351 | 9/2012 |
| GB | 2130735 A | 6/1984 |
| JP | S60-175361 | 9/1985 |
| JP | 2001 123923 A | 5/2001 |
| JP | 3120348 | 3/2006 |
| WO | WO 99/14837 | 3/1999 |
| WO | WO 99/22434 | 5/1999 |
| WO | WO 99/41820 | 8/1999 |
| WO | WO 01/37393 A1 | 5/2001 |
| WO | WO 03/001224 A1 | 1/2003 |
| WO | WO 2006/118612 | 11/2006 |
| WO | WO 2011 090511 | 7/2011 |
| WO | WO2012/060766 A1 | 5/2012 |
| WO | WO 2012 125954 | 9/2012 |
| WO | WO 2012/125963 A2 | 9/2012 |
| WO | WO 2012 125968 | 9/2012 |
| WO | WO 2012 125971 | 9/2012 |
| WO | WO 2012/129040 | 9/2012 |
| WO | WO 2013/074544 A2 | 5/2013 |

OTHER PUBLICATIONS

Miller, John M., Power Point Presentation, "Electronic Design Webinar: One Powerful Day, Will the Markey Accept Battery-Ultracapacitor Combinations?" Maxwell Technologies, Oct. 15, 2008, 24 pages.

* cited by examiner

SYSTEM AND METHODS FOR IMPROVED STARTING OF COMBUSTION ENGINES

CROSS-REFERENCE TO RELATED APPLICATIONS

This application claims the benefit of U.S. Provisional Patent Application No. 61/982,559, filed Apr. 22, 2014, entitled "SYSTEM AND METHODS FOR IMPROVED STARTING OF COMBUSTION ENGINES," the disclosure of which is incorporated herein by reference in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to systems and methods for providing a starting system for combustion engines. In particular, the systems and methods use a first energy storage system that provides greater power performance, such as a capacitor system, in combination with a second energy storage system that provides greater energy performance, such as a battery.

Description of the Related Art

Different mechanisms for starting a combustion engine exist. Many of these systems utilize the electrical energy stored in an energy storage system, for example batteries, to provide the initial energy necessary to start an engine. However, conventional systems do not provide efficient mechanisms for preventing depletion of the energy storage system beyond a level needed to restart the combustion engine.

SUMMARY

The systems, methods and devices of this disclosure each have several innovative aspects, no single one of which is solely responsible for the desirable attributes disclosed herein.

One innovative aspect of the subject matter described in this disclosure can be implemented in an engine start system. The engine start system includes a capacitor system, one or more booster batteries, a switch, and a controller. The capacitor system includes one or more capacitors. The one or more booster batteries are connected in parallel with the capacitor system. The one or more booster batteries are configured to be connected in parallel with a primary battery system of an engine. The switch is connected to the one or more booster batteries and is configured to selectively control electrical communication between the one or more booster batteries and the primary battery system. The controller is configured to detect a battery voltage of the primary battery system. The controller is configured to: move the switch to an open state and disconnect the one or more booster batteries from the primary battery system when the battery voltage is below a first target voltage. The controller is configured to move the switch from the open state to a closed state and connect the one or more booster batteries to the primary battery system when the battery voltage is at or above a second target voltage, or in response to an external input.

In one aspect, the first target voltage corresponds to a value of the battery voltage when the primary battery system is not being charged by an external power supply. In one aspect, the external power supply comprises a vehicle alternator.

In one aspect, the second target voltage is between or including the approximate open circuit voltage of the primary battery system and the approximate output voltage of an alternator for a vehicle.

In another aspect, the controller is configured to move the switch from the open state to the closed state in response to the external input; and, after a predetermined period of time, return the switch from the closed state to the open state if the battery voltage is below the second target voltage, or maintain the switch in the closed state if the battery voltage is at or above the second target voltage.

In one aspect, the predetermined period of time is within a range of approximately 10 to 600 seconds. In some embodiments, the predetermined period of time is determined based on a load of an electrical system of the engine. In one aspect, the external input comprises a user-activated switch.

In some embodiments, the first target voltage and second target voltage are approximately the same voltage.

In some embodiments, the first target voltage is greater than a voltage sufficient to activate a starter for an internal combustion engine.

In one aspect, the engine start system further includes at least one sensor configured to detect the battery voltage, the sensor configured to communicate the battery voltage to the controller.

In some aspects, the switch includes one or more of a contactor, relay, DC/DC converter or transistor.

In another aspect, the engine start system further includes an energy storage system, wherein the energy storage system includes the capacitor system and the controller.

In another aspect, the engine start system further includes the primary battery system. In one aspect, the primary battery system is connected to a critical load of a vehicle. One embodiment includes this vehicle.

Another innovative aspect of the subject matter described in this disclosure can be implemented in a method of operating an engine start system. The method includes providing one or more booster batteries connected in parallel with a capacitor system and a primary battery system, detecting a battery voltage of the primary battery system, disconnecting the one or more booster batteries from the primary battery system when the battery voltage is below a first target voltage; and connecting the one or more booster batteries to the primary battery system when the primary battery voltage is at or above a second target voltage, or in response to an external input.

In one aspect, the method further includes applying an external power from an external power source to the booster batteries and the primary battery system. In one aspect, the method includes applying an external power from an alternator.

In another aspect, the first target voltage corresponds to a value of the battery voltage when the external power is not applied.

In one aspect, the second target voltage corresponds to a value between and including the approximate open circuit voltage of the primary battery system and the approximate output voltage of an alternator for a vehicle.

In another aspect, the method further includes disconnecting the one or more booster batteries from the primary battery system in response to the external input; and, after a predetermined period of time, disconnecting the one or more booster batteries from the primary battery system if the battery voltage is below the second target voltage, or connecting and maintaining the connection between the one or more booster batteries and the primary battery system if the battery voltage is at or above the second target voltage.

In one aspect, the predetermined period of time is within a range of approximately 10 to 600 seconds.

In some embodiments, the predetermined period of time is determined based on a load of an electrical system of an engine.

In some embodiments, the external input comprises a user-activated switch.

In some embodiments, the first target voltage and second target voltage are approximately the same voltage.

In some embodiments, the first target voltage is greater than a voltage sufficient to activate a starter for an engine.

In one aspect, detecting includes detecting the battery voltage with a sensor and communicating the battery voltage to a controller.

In some aspects, the disconnecting and connecting include controlling one or more of a contactor, relay, DC/DC converter or transistor.

In some embodiments, the disconnecting and connecting include controlling a switch connected between the one or more booster batteries and the primary battery system.

In one aspect, controlling the switch includes providing a control signal to the switch from an energy storage system, wherein the energy storage system includes the capacitor system.

Details of one or more implementations of the subject matter described in this disclosure are set forth in the accompanying drawings and the description below. Although the examples provided in this disclosure are primarily described in terms of a vehicle system or an engine system, the concepts provided herein may apply to other types of systems with or within which an energy storage system is implemented. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DESCRIPTION

Figure 1:
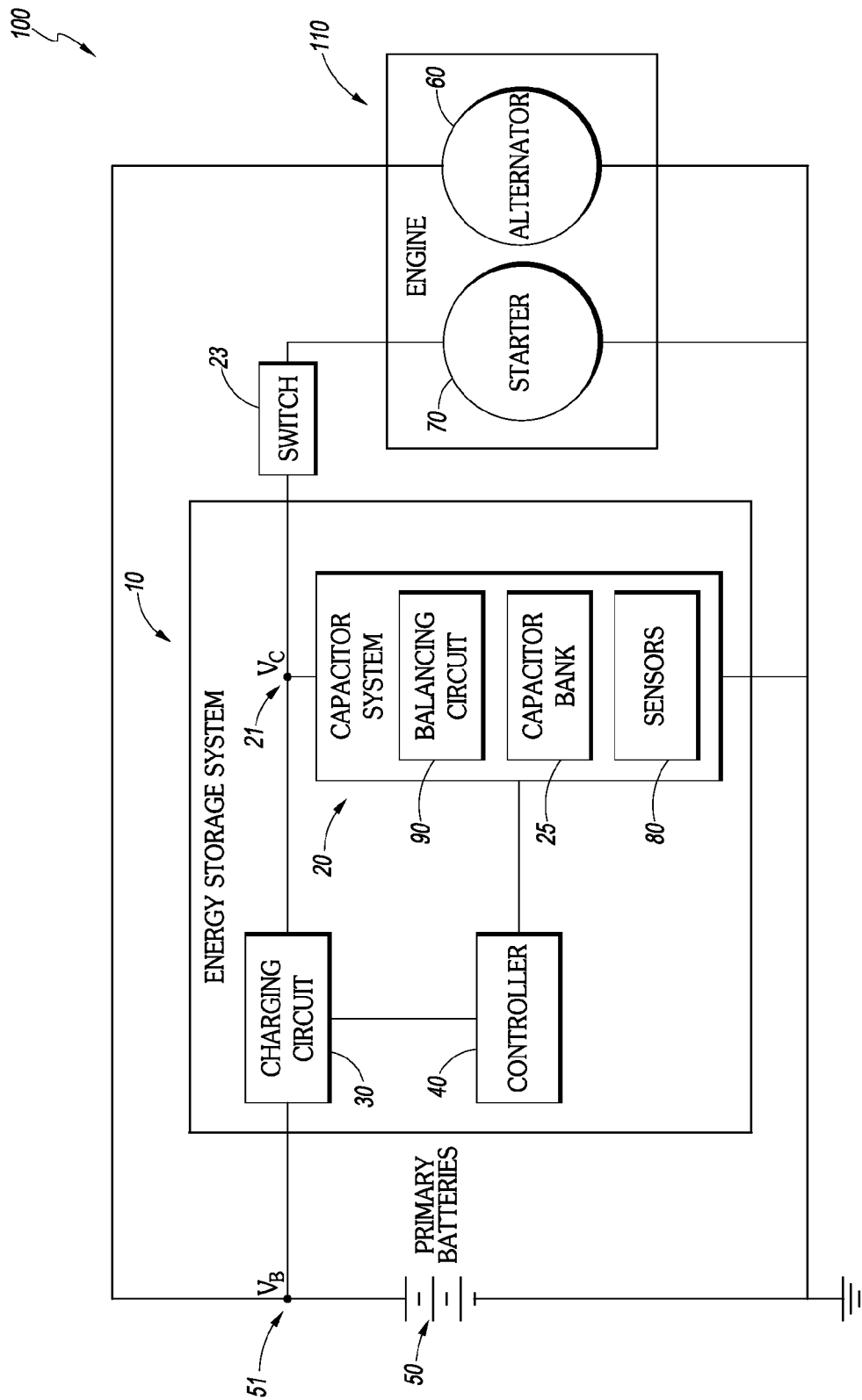
FIG. 1 is a system block diagram illustrating an embodiment of an energy storage system implemented within an internal combustion engine start system.

The electrical loads of a combustion engine system can be classified into two categories: critical and non-critical loads. In the context of the present disclosure, critical loads refer to those loads related to reliably start a combustion engine, and to which an insufficient power supply may prevent an engine start. These include, for example, the electronics and circuitry that provide electrical signaling to a starter circuit of a combustion engine to start the engine, independently of the significant power needed to turn the starter itself. For example, in a vehicular context, if there is no power to the dashboard, ignition switch, etc., a vehicle may not start, even if there is sufficient power to the actual starter itself. Examples of critical loads in a vehicular context may include the engine control unit (ECU), injector controller, engine computers and fuel injectors. Non-critical loads can refer to auxiliary loads, for example, radios, fans or interior lights in a vehicle using the combustion engine. In a trucking context, some of the auxiliary loads are often referred to as "sleeper loads," as these loads are often drawn when the truck operator is parked and asleep, with the combustion engine off.

Some critical and non-critical loads also have different power requirements. Some loads, such as radios and fans, may require low and continuous power, while other loads, such as the starter of a combustion engine, can require high and instantaneous power to start or crank the engine. Combustion engine systems may include different types of energy storage systems to help provide the power requirement of the different types of loads. For example, batteries, ultracapacitors or asymmetric lithium capacitors can be designed to support higher power loads. Some systems include a capacitor that is implemented with the primary battery, to improve starter performance, such as that described below with respect to FIG. 1.

For a combustion engine, a concern is that non-critical loads can discharge the energy storage systems of the engine to a level that no electrical energy remains to power the critical loads and restart the engine. For example, it is common for a truck operator to sleep in the truck, with the engine and alternator off, and thus without regeneration to the truck battery system, but with other battery loads on, such as the exterior lights, air conditioning, computer power, etc. Upon the operator waking up, the voltage in the battery system has often dropped below a voltage level needed to power the critical loads, requiring a jump start.

In some embodiments, two separate electrical distribution networks along with two separate energy storage systems are provided, one for each category of loads, such that the energy usage of one category limits the effect of the energy usage on another category. In such a design, even if non-critical loads reduce, or completely discharge their corresponding energy storage system, the critical loads still have their own corresponding separate energy storage system to signal and restart the combustion engine. In another embodiment, a combustion engine start system is provided that has two separate energy storage systems, but without complete isolation between critical and noncritical loads. Instead, parts of the energy storage system of the combustion engine are selectively isolated from the loads under certain conditions, such as when the combustion engine is off or when target voltage levels are detected. These embodiments can provide additional power to the critical loads, and improve engine start reliability, without requiring completely separate electrical distribution networks for the two separate energy storage systems.

Embodiments of the invention relate to systems and methods for improved starting of a combustion engine. The combustion engine might be implemented in a vehicle or any power generator system. Embodiments may include a first energy storage system designed for improved power performance, such as a capacitor system, with a second energy storage system designed for improved energy performance, such as a booster battery system, configured to be implemented with a primary battery system to provide electrical power to the vehicle. In some embodiments, the capacitor system includes one or more capacitors, and the battery systems includes one or more batteries, wherein pluralities of capacitors or batteries are arranged into a bank, or set. Embodiments may include systems and methods for managing the efficient operation of a device that can provide capacitor and/or battery-based power to a vehicle, such as a car or truck. The system can include a device that includes one or more batteries and capacitors in one integrated unit that can be mounted into a car or truck. The integrated unit may provide charging power to the vehicle by connecting it to the starter of the vehicle.

In a combustion engine system that uses a capacitor system with the primary battery system, but without the booster battery system described herein, the noncritical loads can drain the primary batteries to a low level, such that the critical loads may not be powered. In this case, the combustion engine may not be restarted, even though a fully charged capacitor bank is available. In this situation, the critical loads may not be powered to signal the use of the energy stored in the capacitor bank to restart the combustion engine. For example, a typical voltage for correct operation of critical loads in a 12-Volt system is approximately 9 Volts (V).

Some embodiments may include a controller configured to provide the functionality described herein. Embodiments of the invention described herein can include any of a number of different software, hardware, firmware, electronic circuits, controllers, computers (including hand-held computing devices), microchips, integrated circuits, printed circuit boards, and/or other microelectronic component known or described herein, or combinations thereof, and methods related thereto, suitable to provide the functionality described herein. Additionally, the functionality described herein for managing a capacitor system can be provided through any suitable electronic, mechanical, pneumatic, hydraulic, and/or other components and/or systems, or combinations thereof, or methods related thereto.

The components and/or systems described herein can be separately or integrally formed with the capacitor system. For example, the booster battery system can be separate or integrally formed with the capacitor system. In some embodiments, the components and/or systems can be implemented with a plurality of capacitors or booster batteries that form a capacitor or booster battery "bank." The capacitors or batteries within these banks can be connected in series, in parallel, or in any matrix combination of capacitors connected in series and in parallel. The specific quantity of capacitors, booster batteries, or other components described in the systems herein is for illustrative purposes only. Additionally, although the embodiments of the systems and methods for managing a capacitor system are described herein in a vehicular context, such as a commercial truck, they are not limited to any particular type of vehicle or system.

Some embodiments of the system and apparatuses described herein can be configured to interact with and/or provide functionality to additional or alternative systems than a capacitor or commercial truck system. For example, the embodiments herein can be implemented with or within other systems that use an internal combustion engine, such as boats or cars, or other types of combustion engine, internal or otherwise. Embodiments of the systems and methods described herein can be implemented with or within a non-vehicular system that uses a capacitor or battery system, such as a power generator for producing electricity. In some embodiments, the systems and apparatuses can be implemented in combination with an internal combustion engine system which may include an engine, an alternator, a battery system and/or a starter system. Some embodiments can be configured to be used as a drop-in replacement for one or more batteries in a vehicular battery system, such as a Battery Council International (BCI) Group 31 or other sized battery. For example, the system can fit within a space envelope of approximately 330 mm length, approximately 173 mm wide, and approximately 240 mm high (including the terminals). In some embodiments, the energy storage systems described herein can be configured to provide a capacitance between a range of approximately 200 farads to approximately 2500 farads, or more narrowly, between a range of approximately 300 farads to approximately 1000 farads, or more narrowly, between a range of approximately 500 to approximately 1000 farads. In some embodiments, the energy storage systems described herein can be configured to provide a capacitance of approximately 1000 farads. In some embodiments, the energy storage systems described herein can be configured to provide a capacitance up to 7000 farads, or even more, for example, when implemented within some military vehicles or other vehicles with large power specifications.

Some embodiments can be implemented with a capacitor/booster battery system that can be connected to a portion of the starting system of a vehicle or truck, to provide energy and power to the starting system. For example, in some embodiments, the capacitor/booster battery system can be connected to a portion of the starter, such as the starter solenoid. Some embodiments can connect a capacitor/booster battery system to the starter of a vehicle, without connecting the starter or the capacitor/booster battery system to the primary battery and/or primary power system within the vehicle. The systems and methods described herein can be implemented within power systems configured for different operational voltages, such as 6 volt systems, 12 volt systems, 24 volt systems, 36 volt systems, 48 volt systems, and other operating system voltages. In some embodiments, the systems and methods described herein can be implemented within systems with an operating voltage typical of a vehicle or internal combustion engine system.

FIG. 1 is a system block diagram illustrating an embodiment of an energy storage system 10 implemented within, for illustrative purposes only, an internal combustion engine start system 100. FIG. 1 is intended to provide context to the features shown in FIGS. 2 and 3 below, and illustrates a combustion engine start system with capacitors, but without a booster battery described further below. The energy storage system 10 can include a capacitor system 20 comprising one or more capacitors. In the illustrated embodiment, the capacitor system 20 comprises a capacitor bank 25 having a plurality of capacitors. The engine start system 100 can be used in combination with an internal combustion engine 110. The capacitor system 20 can be configured to power a starter 70, which is configured to crank and start the internal combustion engine 110. A control switch 23 can be positioned between the capacitor system 20 and the starter, to allow selective electrical communication between the capacitor system 20 and the starter. The engine system 100 can include an alternator 60 configured to charge a primary battery system, illustrated here schematically as one or more primary batteries 50. Although the description herein refers to the primary batteries 50 in the plural, a single primary battery can alternatively be used. The primary batteries 50 can optionally be connected to the starter 70 through a control switch, to provide optional, selective power for starting the engine 110.

There may be some advantages to start engine 110 with the energy storage system 10, because the capacitor system 20 may perform better than comparable battery systems under some conditions. For example, capacitors may hold a charge better, have improved cycle life, provide a quicker charge and discharge time, and have more efficient charge acceptance than a comparable battery. Capacitors may also provide better starter performance at some temperatures, such as a cold-start application. For example, some embodiments of the energy storage system described herein can include a capacitor system with enough energy and power to cold start a 9.0 to 16.0 L diesel engine unassisted at approximately −18° C., or even at temperatures as low as −40° C. or lower.

The energy storage system 10 can include a charging circuit 30 configured to connect to a power source at a battery terminal 51 and provide a current output. The charging circuit 30 can be configured to receive power from the primary batteries 50 and/or the alternator 60, and output a current to charge the capacitor system 20. The charging circuit 30 can be connected to the capacitor system 20 along a capacitor terminal 21, and can charge the capacitor system 20 to a target capacitor output voltage $V_C$. The charging circuit 30 can comprise a DC to DC converter, such as a Single Ended Primary Inductance Converter (SEPIC), a boost converter, a buck-boost converter, a current-limiting resistor, a diode, or any other suitable device for selectively charging a capacitor from a power source, as described herein or known in the art. Any of these charging circuits can be controllable so that the desired charging output voltage to the capacitor can be achieved.

In some embodiments, the charging circuit 30 can provide a constant current output. The charging circuit 30 can be configured to be activated and deactivated to allow and prevent the output current from flowing from charging circuit 30 into the capacitor system 20. The rate of charge from the charging circuit 30 into the capacitor system 20 can be controlled by controlling the rate of activation and deactivation of the output current. The control of charging circuit 30, and other functionality within the energy storage system 10 can be provided by a controller 40. In some embodiments, the energy storage system 10 can include a voltage sensor configured to detect the capacitor output voltage $V_C$ and provide voltage feedback to an operator, the controller 40, or another component or system. In some embodiments, the voltage feedback from the voltage sensor can allow for the user or controller to take an action, such as adjusting the target voltage.

In some embodiments, the capacitor system 20 can include a balancing circuit 90 configured to manage the voltage of individual capacitors within a capacitor bank relative to each other and the overall capacitor output voltage $V_C$. The balancing circuit 90 can "balance" or reduce the differences between the voltages of the individual capacitors. Such balancing can avoid certain capacitors being charged to a higher or lower voltage than other capacitors, which can have an impact on the service life of the capacitor system 20. In some embodiments, the balancing circuit 90 can be configured to allow the overall capacitor output voltage $V_C$ to be reduced from a first target voltage to a second target voltage, as described further herein. The balancing circuit 90 can include a number of different configurations, using wires, printed circuit boards, and the like.

The controller 40 can be in communication with the charging circuit 30, the capacitor system 20, and other components and systems to provide additional functionality to energy storage device 10. For example, the controller 40 can be configured to detect one or more conditions relevant to the capacitor system 20, determine whether the capacitor system 20 should be operated in a degraded state in response to the condition, and take an action based upon the condition detected. For example, the controller 40 can be configured to provide such functionality related to other power source systems such as primary batteries 50 and alternator 60 and other systems.

The controller 40 can detect a condition within the systems described herein using any of a variety of sensing devices and methods. Such sensing devices and methods can be configured to detect a condition relevant to the capacitor system 20. The sensing devices can be positioned within, on, proximate to, or even external to, the capacitor system 20, and still detect a condition relevant to the capacitor system 20. For example, sensing devices can be configured to detect the output voltage $V_C$, the temperature of and pressure within the capacitors of the capacitor system 20, or conditions within the balancing circuit 90. In some embodiments, sensing devices can be configured to detect a condition that is external to, but may still impact the performance of, the capacitor system 20, such as the battery voltage $V_B$, and the condition of the charging circuit 30.

In some embodiments, the capacitor system 20 can include one or more sensors 80 configured to detect a condition relevant to the capacitor system 20 and provide an input to the controller 40. The sensors 80 can be positioned within, on, proximate to, or external to the capacitor system 20. Sensors 80 can include any of a number of different monitoring devices or systems suitable to detect any of a number of different conditions, and communicate the condition to the controller 40. For example, sensors 80 can comprise voltage sensors, capacitance sensors, current sensors, temperature sensors, pressure sensors, and/or other sensors to detect other conditions.

The input to controller 40 of a condition detected by one or more of sensors 80 can be evaluated by the controller 40 to determine whether the condition is related to the capacitor system. Such evaluation can be based upon a comparison of the condition to a programmed setpoint or previously detected condition, such as a difference between the condition and the setpoint, or a more complex algorithm. Any of a number of different detected conditions may be used, and any of a number of actions can be taken in response.

Figure 2:
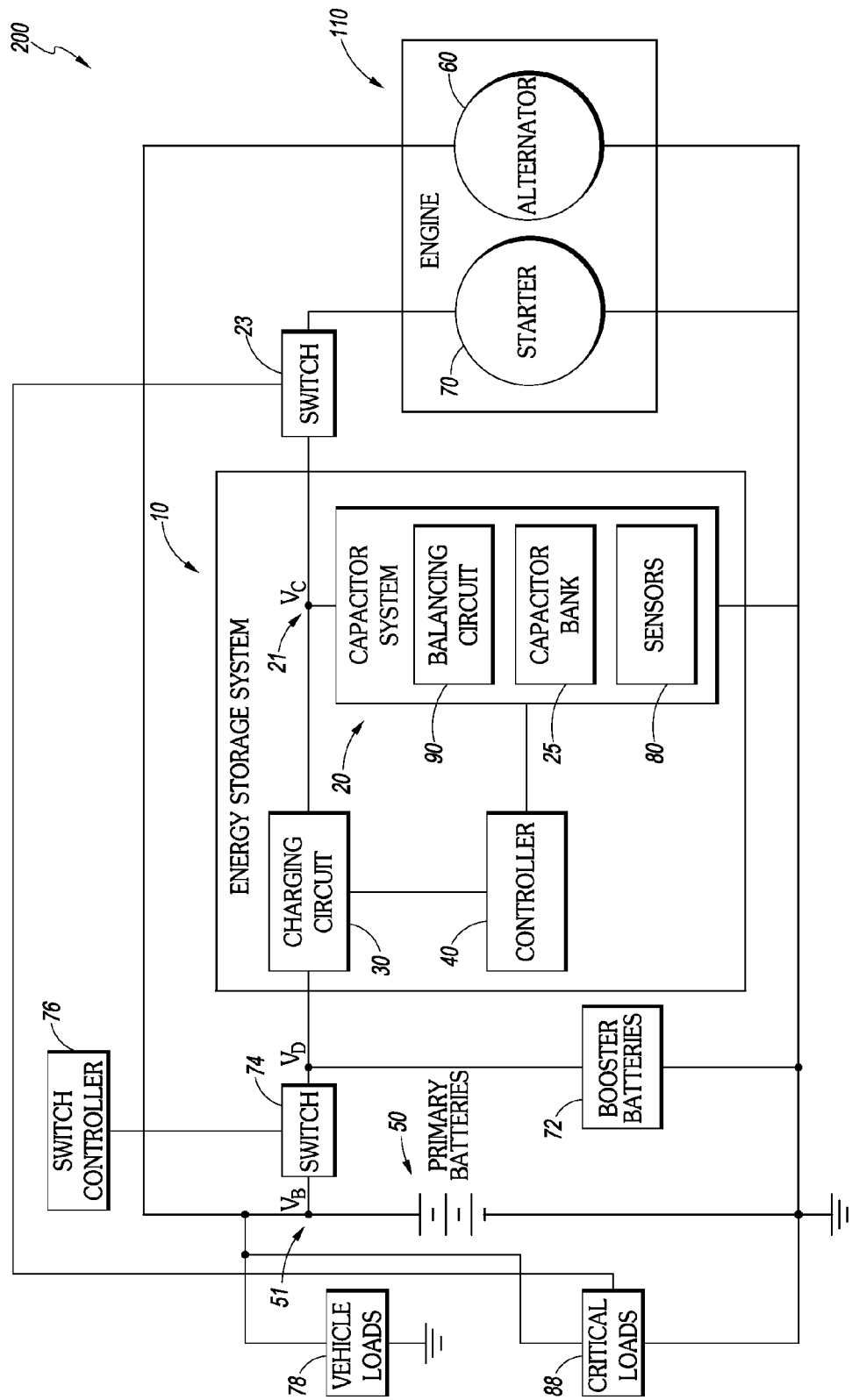
FIG. 2 is a system block diagram illustrating an embodiment of an internal combustion engine start system.

FIG. 2 illustrates a system block diagram of an internal combustion engine start system 200, according to an embodiment. One or more booster batteries 72 can be provided in parallel with the primary battery system (for example, batteries 50). The primary batteries 50 are shown connected to vehicle loads 78 and critical loads 88. The booster batteries 72 can also be implemented in combination with the energy storage system 10 or other capacitor systems. Although the description herein refers to the booster batteries 72 in the plural, a single booster battery can alternatively be used. A switch 74 can be provided between the primary batteries 50 and the booster batteries 72, to selectively isolate the primary batteries 50 from the booster batteries 72 and the energy storage system 10. The switch 74 can be a contactor, relay, DC/DC converter, transistor or other suitable switch devices. The system 200 can include a switch controller 76 which can be configured (for example, programmed) to perform various functions, for example, to control whether the switch 74 is in open state or closed state. The switch controller 76 can be programmed to provide such functions, for example, in response to various conditions.

The switch controller 76 can be configured to open the switch 74 in response to various conditions. For example, the switch controller 76 can move the switch 74 to an open state and disconnect the booster batteries 72 and the energy storage system 10 from the loads 78 and 88 when the battery voltage of the primary batteries 50, $V_B$, is below a first target voltage. This first target voltage can be chosen, for example, to be based on the minimum voltage required to correctly operate the critical loads 88, or within a reasonable tolerance above this value. A typical value for such a minimum voltage, expressed as a percentage of the system voltage, might be approximately 75% of the system voltage. Thus, for example, the minimum voltage of a 12-Volt system can be approximately 9 V. Thus, the first target voltage might be set at this minimum voltage value, or greater, to prevent the voltage $V_D$ of the booster batteries 72 and the capacitor system 20 from dropping below a point at which the critical loads 88 can no longer operate.

In some embodiments, the first target voltage can correspond to a value of the battery voltage at the node 51 when the primary batteries 50 are not being charged by an external power source, such as the alternator 60. A typical value for such a voltage, expressed as a percentage of the output voltage of the external power source, might be approximately 60% of the external power source output voltage. In some embodiments, the first target voltage can be greater than or equal to this value. For example, the first target voltage might be set at a value of approximately 9V, or greater than or equal to approximately 9V, for a system with an alternator that operates at approximately 14.4 V. Thus, when the alternator 60 fails, or is turned off (along with the combustion engine 110) the switch 74 is open, thereby isolating the energy storage system 10 and the booster batteries 72 from the loads 78, 88, increasing likelihood of startup. In some embodiments, the first target voltage can be greater than a voltage sufficient to activate a starter for an internal combustion engine.

The switch controller 76 can be configured to close the switch 74 in response to various conditions. For example, the switch controller 76 can close the switch 74 when the primary batteries 50 are being charged by an external power supply, for example, when the engine 110 is on, allowing the primary batteries 50 and the booster batteries 72 to both be charged by the alternator 60. The switch controller 76 can then move the switch 74 to an open state and disconnect the booster batteries 72 from the primary batteries 50 when the primary batteries are not being charged by an external power supply, as described above, for example, when the engine 110 is off and the alternator 60 is not providing energy.

The switch controller 76 can move the switch 74 from the open state to the closed state, to connect the one or more booster batteries 72 to the primary batteries 50. For example, controller 76 may be configured to move the switch 74 to the closed state when the battery voltage at the node 51 is at or above a second target voltage. In some embodiments, the second target voltage can correspond to approximately the output voltage of an external power source, such as the alternator 60. For example, in a system with an alternator operating at approximately 14.4V, the second target voltage can correspond to approximately 13.7V. In some implementations, the second target voltage can correspond to a value between, and including, the approximate open circuit voltage (OCV) of the primary batteries 50, and the approximate voltage of an external power source, such as the alternator 60. The open circuit voltage (OCV) of the primary batteries 50 can be defined as the voltage difference between the positive and negative terminals of the primary batteries 50, such as the voltage taken at the node 51 when no load or power supply is connected to or is drawing/providing current from the primary batteries 50.

In some embodiments, the first target voltage described above can be expressed as a percentage of the second target voltage, such as greater than or equal to approximately 60% of the second target voltage. In some embodiments, the first target voltage can be the approximate open circuit voltage of the primary batteries 50.

In yet another embodiment, the first target voltage and the second target voltage can be approximately the same voltage. For example, the first target voltage and the second target voltage can both be set at the approximate output voltage of an external power supply, the alternator 60. In this scenario, the switch 74 is open when the battery voltage at the node 51 is below the approximate alternator output voltage (for example, the alternator is off), and the switch 74 is closed when the battery voltage at the node 51 is at or above the approximate alternator voltage (for example, the alternator is on). It will be understood, that in some embodiments, the switch controller 76 can be configured such that the target voltages fall within a hysteresis window, such that high-frequency cycling of the switch 74 may be avoided.

In another embodiment, the first target voltage can be greater than the target voltage needed to activate a starter 70 of the engine 110, to increase the likelihood that the booster batteries 72 are able to provide sufficient voltage to crank the starter.

In one embodiment, the switch controller 76 can close the switch 74 and connect the booster batteries 72 and the energy storage system 10 to the loads 78 and 88 in response to an external input, for example, from an operator of the engine 110. For example, in a vehicle using the combustion engine start system 200, the vehicle operator can control the switch controller 76 from a button on the dashboard of the vehicle to connect the booster batteries 72 and the energy storage system 10 to the loads 78 and 88 when the primary batteries 50 are discharged below a certain voltage, so the critical loads 88 can be powered. The critical loads 88 can then signal the switch 23 to use the energy stored in the energy storage system 10 to start the engine 110 in response to the same input, or in response to another input, such as activation of an ignition switch. The switch controller 76 can be configured to maintain the switch 74 in the closed state for a predetermined period of time, such that the energy stored in the booster batteries 72 and the energy storage system 10 cannot accidentally or intentionally discharge through the loads 78 and 88 before the engine 110 is restarted. This predetermined period of time can be set based on the amount of time required to boot or power up the circuitry in the critical loads 88, but not so long as to allow for accidental or intentional exhaustion of the booster batteries 72 for functions unrelated to powering the critical loads 88 or restarting the engine 110. The predetermined time can be longer in a system in which the electrical loads of the combustion engine system are a lower value than the predetermined time in a system in which the electrical loads of the combustion engine system are a higher value. In some embodiments, the predetermined time can range from 10 seconds to 10 minutes, or in some embodiments, 30 to 120 seconds, or longer if the system does not contain many loads. An upper limit of the predetermined time can be set based on results of empirical tests on available commercial combustion engine systems.

The following explains how the booster batteries 72 and capacitor system 10 can still start the combustion engine system, when the primary batteries 50 are depleted: a practical battery may be modeled as an ideal battery in series with a resistor. The value of this resistor is a function, among other things, the state of charge of the battery and the charging voltage. To reverse the chemical reactions occurring when a battery is discharged, the voltage difference between the positive and negative electrodes typically is set to be higher than a lower limit, for example 2.04V for a lead acid battery (or 12.24V for a 6-cell battery). In this situation, the voltage drop over the internal resistance of both the booster batteries 72 and the primary batteries 50 together with the low discharge voltage of the booster batteries 72, even when fully charged, is not enough to reverse the chemical reactions in the primary batteries 50. The voltage on the node 51 is then equal to the open circuit voltage (OCV) of the booster batteries 72 minus the voltage drop over the internal resistance of the booster batteries 72. In this situation, since the booster batteries 72 is held at a high state of charge (SOC) and the current in the primary batteries 50 is low, the voltage at the node 51 remains at a high level for a period long enough to power the critical loads 88, signal the switch 23 and restart the engine 110. In other words, the power provided from the booster batteries 72 is not wasted in trying to recharge the primary batteries 50 as opposed to powering the critical loads 88.

The switch controller 76 can be implemented to use sensors to detect the battery voltage, $V_B$, at the node 51 to carry out its functions, and other programming functions, similar to the sensors and controllers described elsewhere herein, for example, with respect to the controller 40 and sensors 80. The switch controller 76 can include sensors and circuitry to open or close the switch 74 in response to input from an existing combustion engine system or vehicle control system, for example, based on input from a vehicle control system. The function of the controllers 76 and 40 can be combined in a single controller, which can be integrally formed with or separate from the energy storage system 10. Some aspects of the switch controller 76, such as its external input, may be implemented to be operated manually by an operator of the engine 110 using a pushbutton, or manually operated by the operator of the engine 110 using wireless communication technology, or automatically operated when the operator of the engine 110 turns an ignition key, or automatically controlled by an engine controller using conventional wired I/O connections, or automatically controlled by an engine controller using serial communications. Examples of serial communications include CAN or LIN protocols. The nominal voltage of the booster batteries 72 can be the same as the nominal voltage of the energy storage system 10 or higher or lower, but not lower than the voltage level needed for correct operation of the critical loads 88.

Figure 3:
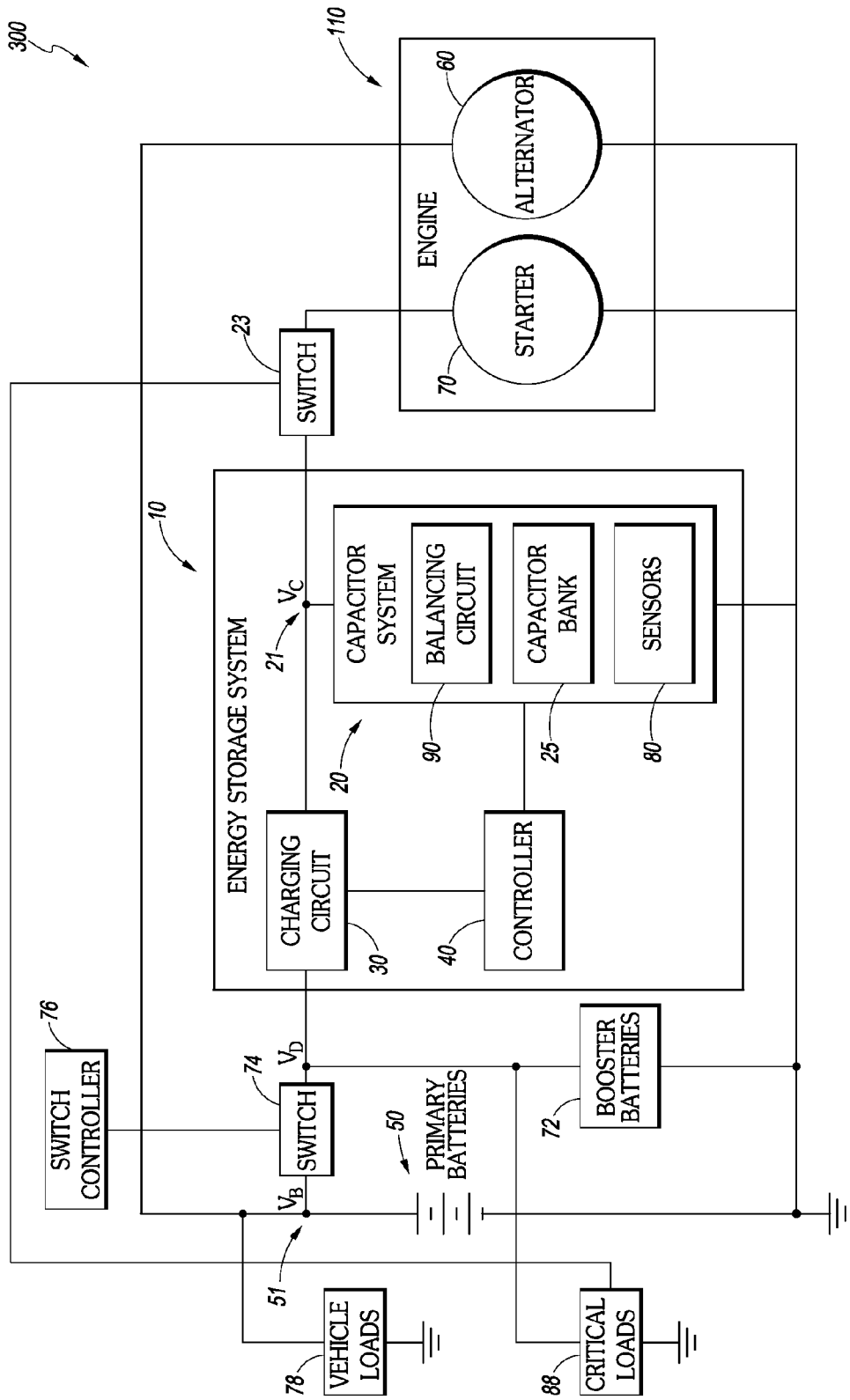
FIG. 3 is a system block diagram illustrating another embodiment of an internal combustion engine start system.

FIG. 3 illustrates a system block diagram of an internal combustion engine start system 300, according to another embodiment. The internal combustion engine start system 300 is similar to the system 200 in FIG. 2, and can provide similar functionality. The system 300 is different from the system 200 in that it provides isolation between the critical loads 88 and noncritical loads 78. The booster batteries 72 are electrically connected to the critical loads 88, independent of the noncritical loads 78. When the switch controller 76 moves the switch 74 to an open position, for example, when the engine 110 is off, the noncritical loads 78 cannot draw power from the booster batteries 72. However, critical loads 88 have access to and can draw power from the booster batteries 72.

Figure 4:
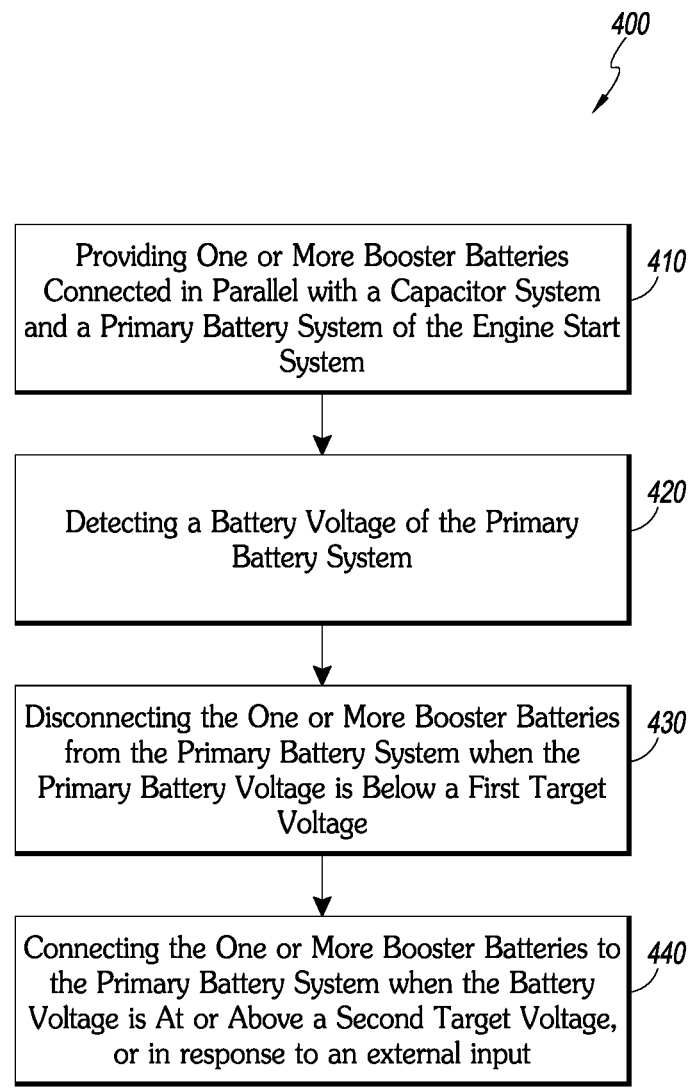
FIG. 4 is a flow diagram illustrating a method of operating a combustion engine start system, according to an embodiment.

FIG. 4 is a flow diagram illustrating a method 400 of operating a combustion engine start system, according to an embodiment. Method 400 can be implemented, for example, using the internal combustion engine start system 200 illustrated in FIG. 2. The method 400 starts at block 410 by providing one or more booster batteries connected in parallel with the capacitor system and a primary battery system of the engine start system. The process 400 then moves to block 420 wherein the battery voltage of the primary battery system is detected. The method then moves to the block 430 wherein the one or more booster batteries are disconnected from the primary battery system when the battery voltage is below a first target voltage. The process 400 then moves to block 440 wherein the one or more booster batteries are connected to the primary battery system when the battery voltage is at or above a second target voltage, or in response to an external input.

Figure 5:
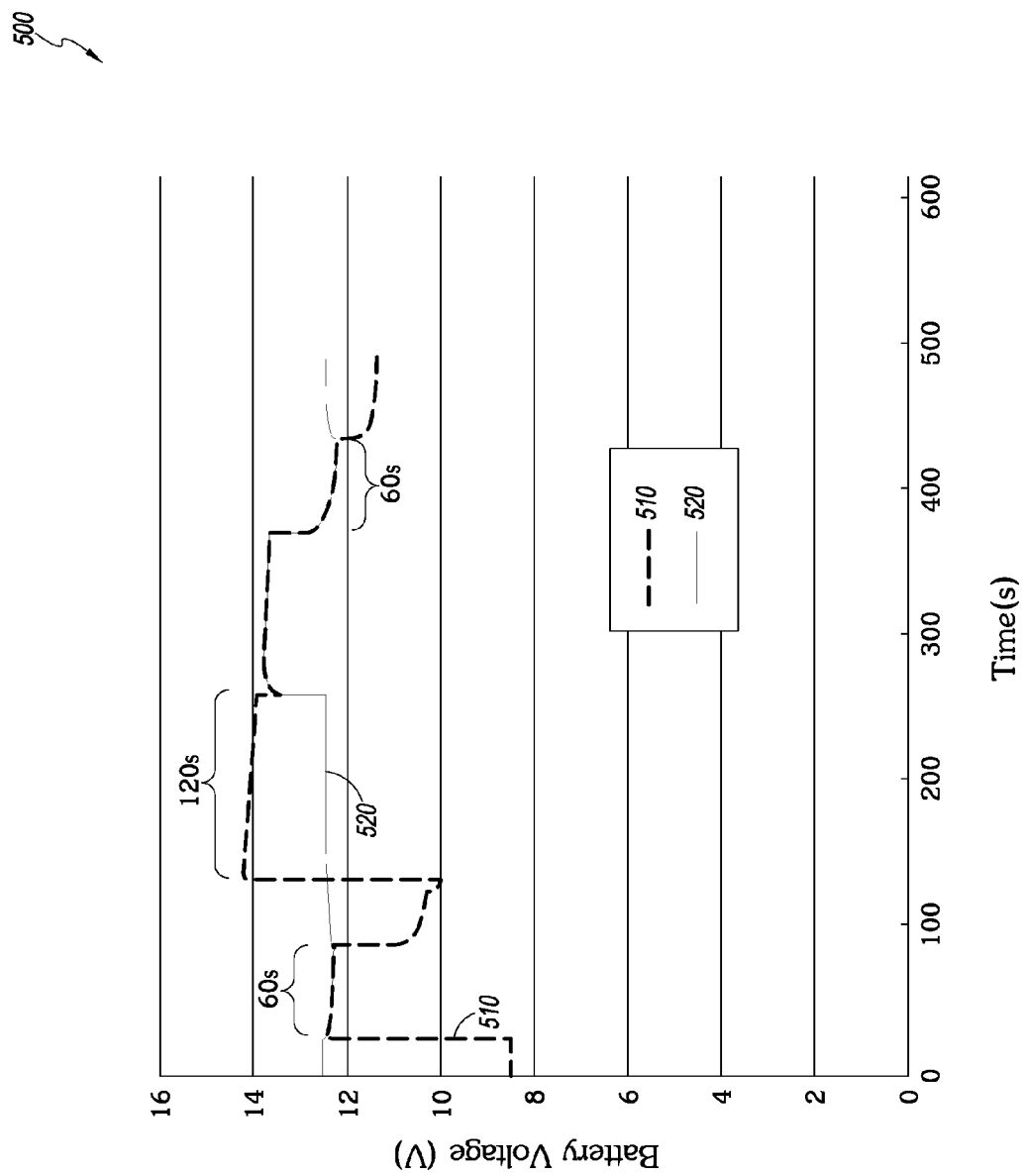
FIG. 5 is a simulation graph illustrating battery voltage as a function of time according to an embodiment.

FIG. 5 is a simulation graph 500 illustrating battery voltage as a function of time according to an embodiment of the system 200 of FIG. 2. The y-axis represents the battery voltage in Volts (V), while the x-axis represents time in seconds (s). Referring to FIGS. 2 and 5, the line 510 represents the battery voltage of the primary batteries 50 at the node 51, while the line 520 represents the battery voltage $V_D$ of the booster batteries 72. Near time 0 second, the primary batteries 50 are in a deeply discharged state of charge (SOC) and the booster batteries 72 are fully charged. Near time 20 seconds, an external input, for example from an ignition key or activation button, is provided to the switch controller 76 to close the switch 74 and connect the booster batteries 72 in parallel to the primary batteries 50. The booster batteries 72 then boost the battery voltage at the node 51 to a level where a successful crank/start of the engine 110 can be performed. In some designs, the voltage at the node 51 is boosted from near 8.5V to near 12.5V, as shown in FIG. 5. If a crank is not performed, the switch controller 76 opens the switch 74 after a predetermined time, for example 60 seconds, to prevent depletion of the booster batteries 72 through noncritical loads 78. To simulate an alternator of the combustion engine, a power supply is connected to the primary batteries 50 near time 150 seconds. The battery voltage of the primary batteries 50 rises, for example in some embodiments to near 14V. In the embodiment simulation shown in FIG. 5, after 120 seconds delay, the switch controller 76 closes the switch 74 to allow the booster batteries 72 to also recharge. Near time 270 seconds, since the booster batteries 72 are not significantly discharged and their internal resistance is lower (or their charge acceptance is higher), than the primary batteries 50, the battery voltage at the node 51 (or the combined OCV of the primary batteries 50 and booster batteries 72), drops slightly below 14 V. Near time 350 seconds, the power supply, simulating a running alternator of an engine 110, is disconnected. The battery voltage at the node 51 now drops below 12.7 V. After a predetermined time, for example 60 seconds in the embodiment shown in FIG. 5, the switch controller 76 opens the switch 74 to prevent the depletion of the booster batteries 72 through the noncritical loads 78. It will be understood that the various parameters used in the simulation that is captured in FIG. 5, such as the times and voltages shown, are not limiting, and are provided to demonstrate the functionality of embodiments of the engine start systems described herein.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, or other device. In the alternative, the processor and the storage medium may reside as discrete components in a user terminal, or other device.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

It will also be understood that although many of the embodiments herein describe the use of various components in combination to form embodiments of a system and method for managing operation of a capacitor system in a degraded state, many of the components can be manufactured and provided independently without other components. For example, embodiments of the system and method for managing operation of a capacitor system in a degraded state, and any of the many other components described herein, or any combination thereof, can be provided separately, and/or as a kit. Thus, the invention is not to be limited otherwise.

What is claimed is:

1. An engine start system, comprising:
 a capacitor system comprising one or more capacitors;
 one or more booster batteries connected in parallel with the capacitor system, the one or more booster batteries configured to be connected in parallel with a primary battery system of an engine;
 a switch connected to the one or more booster batteries and configured to selectively control electrical communication between the one or more booster batteries and the primary battery system; and
 a controller configured to detect a battery voltage of the primary battery system, the controller configured to:
  move the switch to an open state and disconnect the one or more booster batteries from the primary battery system when the battery voltage is below a first target voltage;
  move the switch from the open state to a closed state and connect the one or more booster batteries to the primary battery system when the battery voltage is at or above a second target voltage, and in response to an external input; and
  after a predetermined period of time, return the switch from the closed state to the open state if the battery voltage is below the second target voltage, or maintain the switch in the closed state if the battery voltage is at or above the second target voltage.

2. The system of claim 1, wherein the first target voltage corresponds to a value of the battery voltage when the primary battery system is not being charged by an external power supply.

3. The system of claim 2, further comprising the external power supply, wherein the external power supply comprises a vehicle alternator.

4. The system of claim 1, wherein the second target voltage is between or including the approximate open circuit voltage of the primary battery system and the approximate output voltage of an alternator for a vehicle.

5. The system of claim 1, wherein the predetermined period of time is within a range of approximately 10 to 600 seconds.

6. The system of claim 1, wherein the predetermined period of time is determined based on a load of an electrical system of the engine start system.

7. The system of claim 1, wherein the external input comprises a user-activated switch.

8. The system of claim 1, wherein the first target voltage and second target voltage are approximately the same voltage.

9. The system of claim 1, wherein the first target voltage is greater than a voltage sufficient to activate a starter for an internal combustion engine.

10. The system of claim 1, further comprising at least one sensor configured to detect the battery voltage, the sensor configured to communicate the battery voltage to the controller.

11. The system of claim 1, further comprising an energy storage system, wherein the energy storage system comprises the capacitor system and the controller.

12. The system of claim 1 wherein the switch comprises one or more of a contactor, relay, DC/DC converter or transistor.

13. The system of claim 1, further comprising the primary battery system.

14. The system of claim 13, wherein the primary battery system is connected to a critical load of a vehicle.

15. A vehicle comprising the engine start system of claim 13.

16. A method of operating an engine start system, comprising:
providing one or more booster batteries connected in parallel with a capacitor system and a primary battery system;
detecting a battery voltage of the primary battery system;
disconnecting the one or more booster batteries from the primary battery system when the battery voltage is below a first target voltage;
connecting the one or more booster batteries to the primary battery system when the primary battery voltage is at or above a second target voltage, or in response to an external input;
disconnecting the one or more booster batteries from the primary battery system in response to the external input; and
after a predetermined period of time, disconnecting the one or more booster batteries from the primary battery system if the battery voltage is below the second target voltage, or connecting and maintaining the connection between the one or more booster batteries and the primary battery system if the battery voltage is at or above the second target voltage.

17. The method of claim 16, further comprising applying an external power from an external power source to the booster batteries and the primary battery system.

18. The method of claim 17, wherein applying an external power comprises applying external power from an alternator.

19. The method of claim 17, wherein the first target voltage corresponds to a value of the battery voltage when the external power is not applied.

20. The method of claim 16, wherein the second target voltage corresponds to a value between and including the approximate open circuit voltage of the primary battery system and the approximate output voltage of an alternator for a vehicle.

21. The method of claim 16, wherein the predetermined period of time is within a range of approximately 10 to 600 seconds.

22. The method of claim 16, wherein the predetermined period of time is determined based on a load of an electrical system of an engine.

23. The method of claim 16, wherein the external input comprises a user-activated switch.

24. The method of claim 16, wherein the first target voltage and second target voltage are approximately the same voltage.

25. The method of claim 16, wherein the first target voltage is greater than a voltage sufficient to activate a starter for an engine.

26. The method of claim 16, wherein detecting comprises detecting the battery voltage with a sensor and communicating the battery voltage to a controller.

27. The method of claim 16, wherein disconnecting and connecting comprise controlling one or more of a contactor, relay, DC/DC converter or transistor.

28. The method of claim 16, wherein disconnecting and connecting comprise controlling a switch connected between the one or more booster batteries and the primary battery system.

29. The method of claim 28, wherein controlling the switch comprises providing a control signal to the switch from an energy storage system, wherein the energy storage system comprises the capacitor system.

* * * * *